United States Patent
Baiye

(10) Patent No.: US 7,873,554 B2
(45) Date of Patent: Jan. 18, 2011

(54) METHOD AND SYSTEM FOR PROVIDING A FIXED RATE ANNUITY WITH A LOCK-IN INTEREST RATE FEATURE

(75) Inventor: Simpa Baiye, Simsbury, CT (US)

(73) Assignee: Hartford Fire Insurance Company, Hartford, CT (US)

(*) Notice: Subject to any disclaimer, the term of this patent is extended or adjusted under 35 U.S.C. 154(b) by 0 days.

(21) Appl. No.: 12/701,745

(22) Filed: Feb. 8, 2010

(65) Prior Publication Data

US 2010/0138245 A1    Jun. 3, 2010

Related U.S. Application Data

(63) Continuation of application No. 11/787,493, filed on Apr. 16, 2007, now Pat. No. 7,660,757.

(51) Int. Cl.
*G06Q 40/00* (2006.01)

(52) U.S. Cl. .................................. 705/35; 705/36 R

(58) Field of Classification Search ............... 705/35, 705/36 R, 36 T, 38, 39, 40, 4
See application file for complete search history.

(56) References Cited

U.S. PATENT DOCUMENTS

| | | | |
|---|---|---|---|
| 5,754,980 A | 5/1998 | Anderson et al. | |
| 5,878,405 A | 3/1999 | Grant et al. | |
| 5,893,071 A | 4/1999 | Cooperstein | |
| 5,913,198 A | 6/1999 | Banks | |
| 5,926,800 A | 7/1999 | Baronowski et al. | |
| 5,933,815 A | 8/1999 | Golden | |
| 6,275,807 B1* | 8/2001 | Schirripa | 705/36 R |
| 6,611,808 B1 | 8/2003 | Preti et al. | |
| 6,611,815 B1 | 8/2003 | Lewis et al. | |
| 6,636,834 B1* | 10/2003 | Schirripa | 705/36 R |
| 6,950,805 B2 | 9/2005 | Kavanaugh | |
| 6,963,852 B2 | 11/2005 | Koresko | |
| 7,016,871 B1 | 3/2006 | Fisher et al. | |
| 7,080,032 B2* | 7/2006 | Abbs et al. | 705/35 |
| 7,089,201 B1 | 8/2006 | Dellinger et al. | |
| 7,113,913 B1 | 9/2006 | Davis et al. | |
| 7,376,608 B1* | 5/2008 | Dellinger et al. | 705/36 R |
| 7,398,241 B2* | 7/2008 | Fay et al. | 705/36 R |
| 7,613,644 B1 | 11/2009 | Abbs et al. | |
| 7,624,058 B1 | 11/2009 | Abbs et al. | |

(Continued)

OTHER PUBLICATIONS

Shapiro et al. "Separating Annuity Buyers by Fixed vs. Variable" Apr. 5, 1993, National Underwriter (Life.Health.Financial Services), V97N14 PP20-21.*

(Continued)

*Primary Examiner*—Kelly Campen
(74) *Attorney, Agent, or Firm*—Howard IP Law Group, PC

(57) ABSTRACT

A data processing method and system administers a deferred annuity product during the accumulation phase of a contract term. The annuity product permits the client to select both an interest rate which is reset periodically (reset rate) and an interest rate which is guaranteed for multiple years (MYG rate), during the same contract term. The client may elect to automatically switch from the reset rate to the MYG rate, for the remainder of the contract term, when the reset rate falls below the MYG rate.

20 Claims, 2 Drawing Sheets

U.S. PATENT DOCUMENTS

| | | |
|---|---|---|
| 2001/0014873 A1 | 8/2001 | Henderson et al. |
| 2001/0047325 A1 | 11/2001 | Livingston |
| 2002/0035527 A1 | 3/2002 | Corrin |
| 2002/0174045 A1 | 11/2002 | Arena et al. |
| 2002/0188540 A1 | 12/2002 | Fay et al. |
| 2003/0088430 A1 | 5/2003 | Ruark |
| 2003/0105652 A1 | 6/2003 | Arena et al. |
| 2003/0120570 A1 | 6/2003 | Dellinger et al. |
| 2003/0163402 A1 | 8/2003 | Kincart |
| 2004/0039601 A1 | 2/2004 | Anderson |
| 2004/0039608 A1 | 2/2004 | Mazur et al. |
| 2004/0088236 A1 | 5/2004 | Manning |
| 2004/0172350 A1 | 9/2004 | Atkinson et al. |
| 2004/0181436 A1 | 9/2004 | Lange |
| 2004/0204951 A1 | 10/2004 | Wood et al. |
| 2004/0267647 A1 | 12/2004 | Brisbois |
| 2005/0010453 A1 | 1/2005 | Terlizzi et al. |
| 2005/0060251 A1 | 3/2005 | Schwartz et al. |
| 2005/0080698 A1 | 4/2005 | Perg et al. |
| 2005/0144103 A1 | 6/2005 | Perg et al. |
| 2005/0240521 A1 | 10/2005 | Fuentes-Torres |
| 2006/0074787 A1 | 4/2006 | Perg et al. |
| 2006/0080148 A1 | 4/2006 | Koresko |
| 2006/0089892 A1 | 4/2006 | Sullivan et al. |
| 2006/0095353 A1 | 5/2006 | Midlam |
| 2006/0111997 A1 | 5/2006 | Abbott et al. |
| 2006/0111998 A1 | 5/2006 | Fisher et al. |
| 2006/0143055 A1 | 6/2006 | Loy et al. |
| 2006/0149651 A1 | 7/2006 | Robinson |
| 2006/0155622 A1 | 7/2006 | Laux |
| 2006/0190373 A1 | 8/2006 | Perg et al. |
| 2006/0195375 A1 | 8/2006 | Bohn |
| 2006/0206398 A1 | 9/2006 | Coughlin |
| 2006/0206401 A1 | 9/2006 | Abbs et al. |
| 2006/0212379 A1 | 9/2006 | Perg et al. |
| 2006/0212380 A1 | 9/2006 | Williams et al. |
| 2007/0011063 A1 | 1/2007 | Shelon et al. |
| 2007/0011069 A1 | 1/2007 | Bevacqua Jr. |
| 2007/0011086 A1 | 1/2007 | Dellinger et al. |
| 2007/0021986 A1 | 1/2007 | Cheung et al. |
| 2007/0038488 A1 | 2/2007 | Bauer et al. |
| 2007/0078690 A1 | 4/2007 | Kohl |
| 2007/0100715 A1 | 5/2007 | O'Donnell et al. |
| 2007/0100720 A1 | 5/2007 | Bonvouloir |
| 2007/0100726 A1 | 5/2007 | O'Flinn et al. |
| 2007/0100727 A1 | 5/2007 | Multer et al. |
| 2007/0106589 A1 | 5/2007 | Schirripa |
| 2007/0162380 A1 | 7/2007 | Conroy |
| 2007/0198352 A1 | 8/2007 | Kannegiesser |
| 2007/0198377 A1 | 8/2007 | Livingston et al. |
| 2007/0239572 A1 | 10/2007 | Harris et al. |
| 2007/0244777 A1 | 10/2007 | Torre et al. |
| 2007/0271201 A1 | 11/2007 | Armand et al. |
| 2007/0278288 A1 | 12/2007 | Simmons |

OTHER PUBLICATIONS

Anonymous "Q2 2005 American Eqty Invt Life Hld Co Earnings Conference Call-Final" Aug. 4, 2005, Fair Disclosure Wire.*

Prospectus, Penn Mutual Variable Annuity Account III, Enhanced Credit Variable Annuity; May 1, 2007.

"Glossary of Insurance Terms", Insurance Information Institute, http:www.iii.org/media/glossary (Jan. 1, 2008).

Penn Mutual Variable Annuity Account III, SEC Form 497, Filed Oct. 2, 2006.

New York Life Longevity Benefit Variable Annuity Brochure, New York Life Insurance Company, May 2007.

New York Life Longevity Benefit Variable Annuity FactSheet, New York Life Insurance Company, May 2007.

Paradis, T., More Funds Adopt Performance-Based Fees, Washingtonpost.com (Associated Press), Apr. 8, 2007.

"Facts about the New York Life Longevity Benefit Variable Annuity Product", New York Life Insurance Company, May 2007.

New York Life Longevity Benefit Variable Annuity Prospectus Amendment dated Aug. 15, 2007, New York Life Insurance Company, Aug. 2007.

S&P U.S. Indices Index Methodology, Standard & Poor's, Sep. 2007.

Blodget, H., Money for Nothing: The Real Trouble with Mutual Funds, Slate.com, Dec. 1, 2004.

"Income Select for Life"; Transamerica Financial Life Insurance Company; https://www.transamericaadvisor.com/contentServer/MediaServer? uri=/site/tciidex/media/PDF/Annuities_TCI/Client_Approved_Material/Tips_and_Techniques/BRIS.pdf.

"Jackson Enhances Living Benefit Options within its Perspective Family of Variable Annuities"; Business Wire; Apr. 30, 2007.

"Learn the Basics about Lifetime Legacy"; http://www.americo.com/lifetime/lifetimelegacy.html; Accessed Jan. 4, 2008.

"Accelerated Death Benefits"; http://www.medicare.gov/; Accessed Jan. 4, 2008.

"Alternatives to Long Term Care Insurance (LTCi)"; Senior Wealth Protection Advocates; http://www.senior-wealth-protection-advocates.com/long-term-care-insurancealternatives.html; Site Accessed Jan. 4, 2008.

"Just the Facts: The Best of America All American Gold Annuity Key Facts"; Nationwide Financial Services, Inc.; https://ssc.nwseivicecenter.com/media/pdf/product/VAM-0504AO-FI.pdf.

Form N-4, Transamerica Life Insurance Company; Flexible Premium Variable Annuity-J; Separate Account VA Y; filed Feb. 22, 2006.

"Fidelity.com Glossary" (letter "p"); https://scs.fidelity.com/webxpress/help/topics/help_definition_p.shtml; Accessed Jan. 4, 2008.

Stout, R.G. et al.; "Dynamic Retirement Withdrawal Planning"; Financial Services Review 15 (2006) 117-131.

"Prudential Investments Introduces Strategic Partners Annuity One; New Variable Annuity Offers Investors World-Class Money Managers and Flexible Product Features"; Business Wire, Oct. 9, 2000.

"Retireonyourterms"; http://www.retireonyourterms.com/ glossary/GlossaryText.htm; Accessed Jan. 4, 2008. .

Buckingham, B.; "Making IRAs Last a Lifetime with Annuities"; Life & Health Advisor; Mar. 2006.

"RiverSource Innovations Select Variable Annuity"; http://www.riversource.com/rvsc/global/docs/INNOV-SELECT-NY-AAG.pdf.

"Pacific Life Individual (k) Program"; https://annuities.myaccount.pacificlife.com/public/corporate/product_info/pos/guide pos_1911-07b.pdf.

Key to Making Retirement Savings last: The Withdrawal Rate, New York Life, www.newyorklife.com/cda/0,3254,14198,00.html. (accessed May 22, 2008) .

Shapiro et al. "Separating Annuity Buyers by Fixed vs. Variable" Apr. 5, 1993, National Underwriter Life.Health.Financial Serviecs), V97N14 PP20-21.

"The Power and Protection of Income Annuities" (Empire Fidelity Investments Life Insurance Company), http://personal.fidelity.com/products/annuities/pdf/IncomeAnnuitySpecialReport.pdf.

Form 485BPOS (Apr. 26,2006), Transamerica-NewLTC-LifetimeGMWB_May2006SECFiling.pdf.

* cited by examiner

METHOD AND SYSTEM FOR PROVIDING A FIXED RATE ANNUITY WITH A LOCK-IN INTEREST RATE FEATURE

RELATED APPLICATIONS

This application is a continuation application of co-pending U.S. patent application Ser. No. 11/787,493 entitled METHOD AND SYSTEM FOR PROVIDING A FIXED RATE ANNUITY WITH A LOCK-IN INTEREST RATE FEATURE, filed Apr. 16, 2007, the entire contents of which are herein incorporated by reference for all purposes.

BACKGROUND OF THE INVENTION

1. Field of the Invention

The present invention relates to a method and system for providing a client with the benefit of a fixed rate annuity, offering both a static, guaranteed rate for a multi-year period, as well as a rate which fluctuates periodically (reset rate); more particularly, to a method and system wherein a client initially selects the reset rate while retaining a one time option, exercised manually or automatically, to switch to, or lock in, the guaranteed interest rate for the remainder of the contract term, when the reset rate falls below the guaranteed rate.

2. Description of the Prior Art

A deferred annuity is typically used to provide accumulation and, potentially, a future stream of annuity income. The deferred annuity comprises an accumulation period during which the account value will vary with the underlying investments. Deferred annuities typically provide guaranteed income for life which transfers some portion or all of the risk of outliving ones accumulated assets to the insurer.

One basis for distinguishing commonly available deferred annuities is whether the annuity is classified as a fixed annuity or a variable annuity. In a fixed annuity, the insurer guarantees a fixed rate of interest applicable to each annuity deposit. Therefore, a fixed annuity is desirable for those seeking a safe investment. The guaranteed interest may apply for a specified period of time, often one year or more. Often, a rate guaranteed for more than one year is called a multi-year guarantee (MYG rate). The rate credited on a fixed annuity is reset periodically, moving in an amount and a direction that correlates with the yields available on fixed-income investments available to the insurer. The rate may also be adjusted based upon an external index. For a given term, fixed annuities typically only offer clients the fore-mentioned guaranteed rate of interest for multi-years (MYG rate) or alternatively, an initial rate that can be reset periodically (typically annually). The MYG rate is often lower than the reset rate because the insurer has less flexibility. A client must select only one of these options during a contract term.

Thus, typically, a client seeking a high rate of return, who selects a fixed annuity, elects to receive rates that can be reset periodically, and faces the risk that the issuing company may significantly lower rates at the end of each period within the life of the contract. This exposure to risk reduces the attractiveness of the annuity as an investment. Potential clients who require a certain level of income in retirement, and will be depending upon the annuity to supply that income, may seek other investments, outside of the annuity market, without that potential exposure.

Thus, there remains a need in the art for a data processing method, for administering an annuity product for a contract term, wherein the annuity product has a lock-in feature that provides a guarantee that the interest payable will not fall below a guaranteed interest rate, should adjustable rates be significantly reset downwards. In addition, there is needed an annuity product wherein a guaranteed interest rate is automatically applied to the account balance of the annuity, when an adjustable interest rate payable falls below the guaranteed interest rate, so that the client need not concern himself or herself with the fluctuations in the adjustable rate.

SUMMARY OF THE INVENTION

The present invention provides a data processing method and system for administering a deferred annuity product during the accumulation phase of a contract term, wherein the annuity product permits the client to select both an interest rate which is reset periodically (reset rate) and an interest rate guaranteed for multiple years (MYG rate), during the same contract term. If the consumer selects the reset rate initially, typically the consumer is earning a higher rate of interest on the consumers premiums than that which is provided by the MYG rate but is also assuming a risk that the reset rate will decrease.

The insurer adjusts the reset rate at its discretion or based upon an external index. The insurer declares the reset rate in advance of its effective date and at any point in time, it may be lower than the MYG rate, which is applied on the day the annuity contract is issued. In the event the reset rate is lower than the MYG rate, the client has the option of electing that the MYG rate be applied, from that point forward, to the clients account balance. In another embodiment of the invention, the election may be made automatic such that once the reset rate falls below the MYG rate, no action on the clients part is required to change the interest rate to the guaranteed, MYG rate. The election of the MYG rate, subsequent to the election of the reset rate, is a one-time option and applies until the end of the contract term, regardless of whether the election is automatic or initiated by the client.

The present invention solves several of the problems associated with conventional administration of annuity products. It provides an annuity product, system, and method, which will reduce the risk of annuitants who elect to receive adjustable rates that can be reset periodically. Specifically, it provides an annuity product, system, and method containing a lock-in feature providing a guarantee that the adjustable interest rate payable to the client will not fall below a declared guaranteed interest rate, should the adjustable interest rate be significantly reset downwards. It also provides an annuity product, system, and method including this lock-in feature, as an option for the annuitant to exercise at will, or as an automatic feature elected upon issue of the annuity.

BRIEF DESCRIPTION OF DRAWINGS

The invention will be more fully understood and further advantages will become apparent when reference is had to the following detailed description of the preferred embodiments and the accompanying drawings, in which.

DESCRIPTION OF THE PREFERRED EMBODIMENTS

The present invention comprises a data processing system and method for administering an annuity product containing a lock-in interest rate feature. The system, method, and product provide the client with both the benefit of an adjustable interest rate, which reflects the movement of an external measure or insurer discretion, as well as a guaranteed interest rate. According to the invention, the lock-in feature insures that the interest rate payable to the client will not fall below a declared guaranteed interest rate, should the adjustable rate be significantly reset downwards. The client may select the lock-in as an automatic feature, elected upon issue of the annuity, or return the right to pick and choose, if and when, the guaranteed interest rate feature will be applied. The unique combination of these two capabilities makes the present invention a superior investment choice for clients, who wish to insure that their annuity accumulates enough to provide an adequate payout stream but at the same time, do not wish to absorb the significant risk that the interest rate they receive falls below a declared minimum level.

Figure 1:
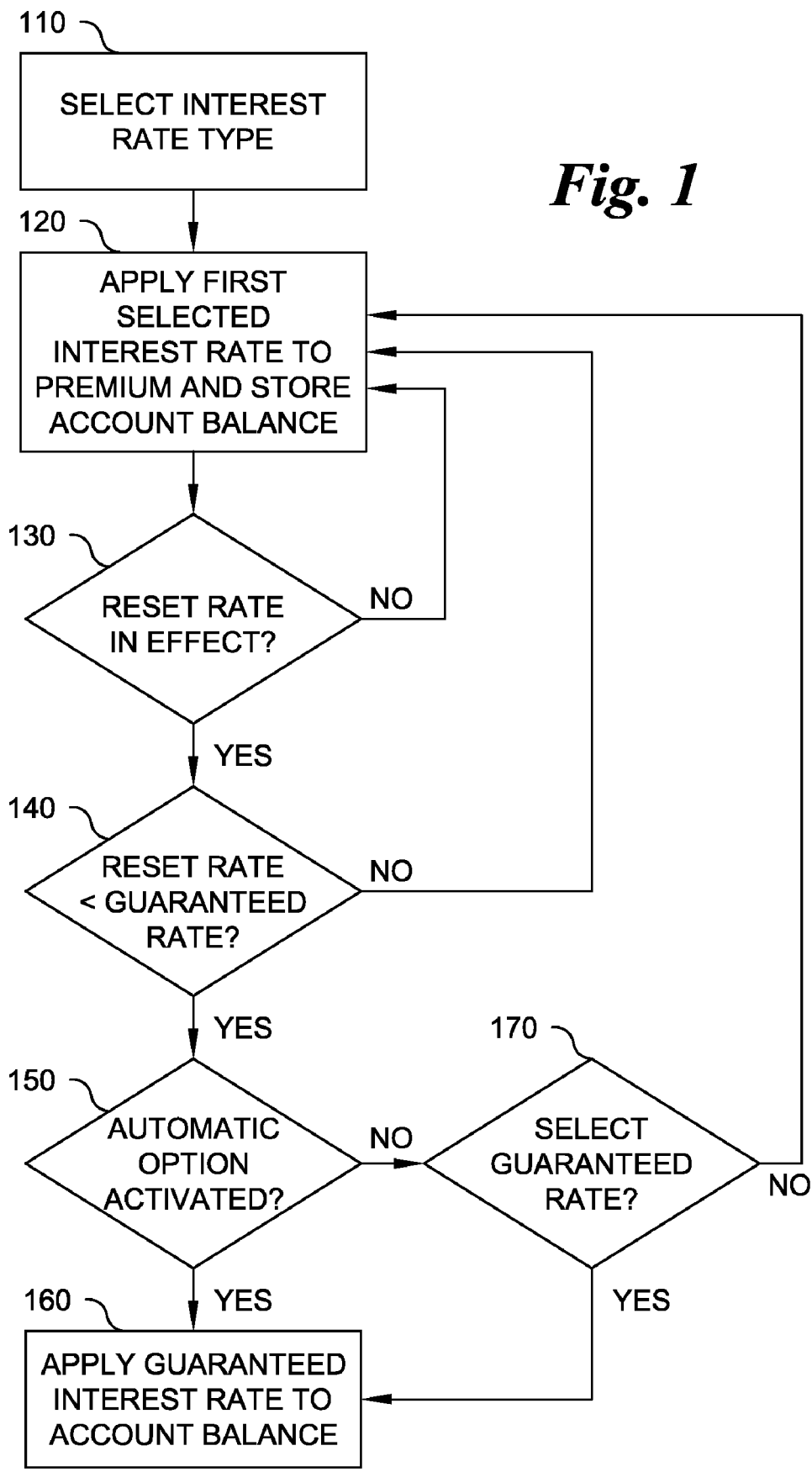
FIG. 1 is a flow chart illustrating a preferred embodiment of the present invention comprising a data processing method for administering an annuity product with a rate lock-in feature.

FIG. 1 is a flow chart illustrating a preferred embodiment of the present invention comprising a data processing method for administering an annuity product with an interest rate lock-in feature. It should be understood that the order of the successive method steps is shown for the sake of illustrating but one example and that the order of method steps can proceed in any variety of orders. In step 110, the client selects the type of interest rate the client wishes to be applied to the clients premiums, during the accumulation phase of the fixed rate annuity. If the client wishes to absorb no risk at all, the client selects a guaranteed interest rate (MYG rate) for the guaranteed period. Typically the guaranteed period is several years or more.

In step 110, the client may also select to have an adjustable rate (reset rate) applied to the clients premiums during the accumulation phase. The insurer declares this rate periodically, typically annually. The rate declared may be higher, lower, or equal to the MYG rate and is typically based upon an external index; however, the insurer may use its own discretion in selecting the rate percent. The client may also select a third choice, unique to this product, to have the insurer automatically apply the reset rate to the clients premium, until such time as the reset rate falls below the MYG rate. Should this event occur, the clients accumulated account balance earns interest at the MYG rate, until the end of the contract term. This automatic transfer is a one-time event. In accordance with this third option, the reset rate is no longer available as an option for the client, once the client has transferred to the MYG rate. In an alternate embodiment, this automatic option is not available to the client and the client must manually request the transfer of funds and the application of the MYG rate for the remainder of the contract term.

In step 120, the insurer calculates the interest credits the client has accumulated at the end of each period, by multiplying the account value by the selected rate. The insurer adds the interest credits to the existing account value to generate a new accumulated account value. In step 130, periodically, the insurer checks to see whether the reset rate has been selected, if it has, the insurer proceeds with step 140. In step 140, the insurer compares the reset rate with the MYG rate to see if the reset rate is the lower of the two rates. If not, the insurer applies the rate selected, i.e. the reset rate. If the reset rate is now lower than the MYG rate, the insurer proceeds to step 150.

In step 150, the insurer checks to see whether the client has selected the automatic option. If yes, the insurer applies the MYG rate to the clients premium and the account balance is earmarked for application of the MYG rate for the remainder of the contract term. If the client has not selected the automatic option, the insurer proceeds to step 170. In step 170, the client has the option of continuing to have the reset rate applied to the clients premiurrand account balance or changing to the MYG rate. If the client decides to select the MYG rate, this is a one-time only change, which will be applied to the clients account balance for the remainder of the contract term.

Figure 2:
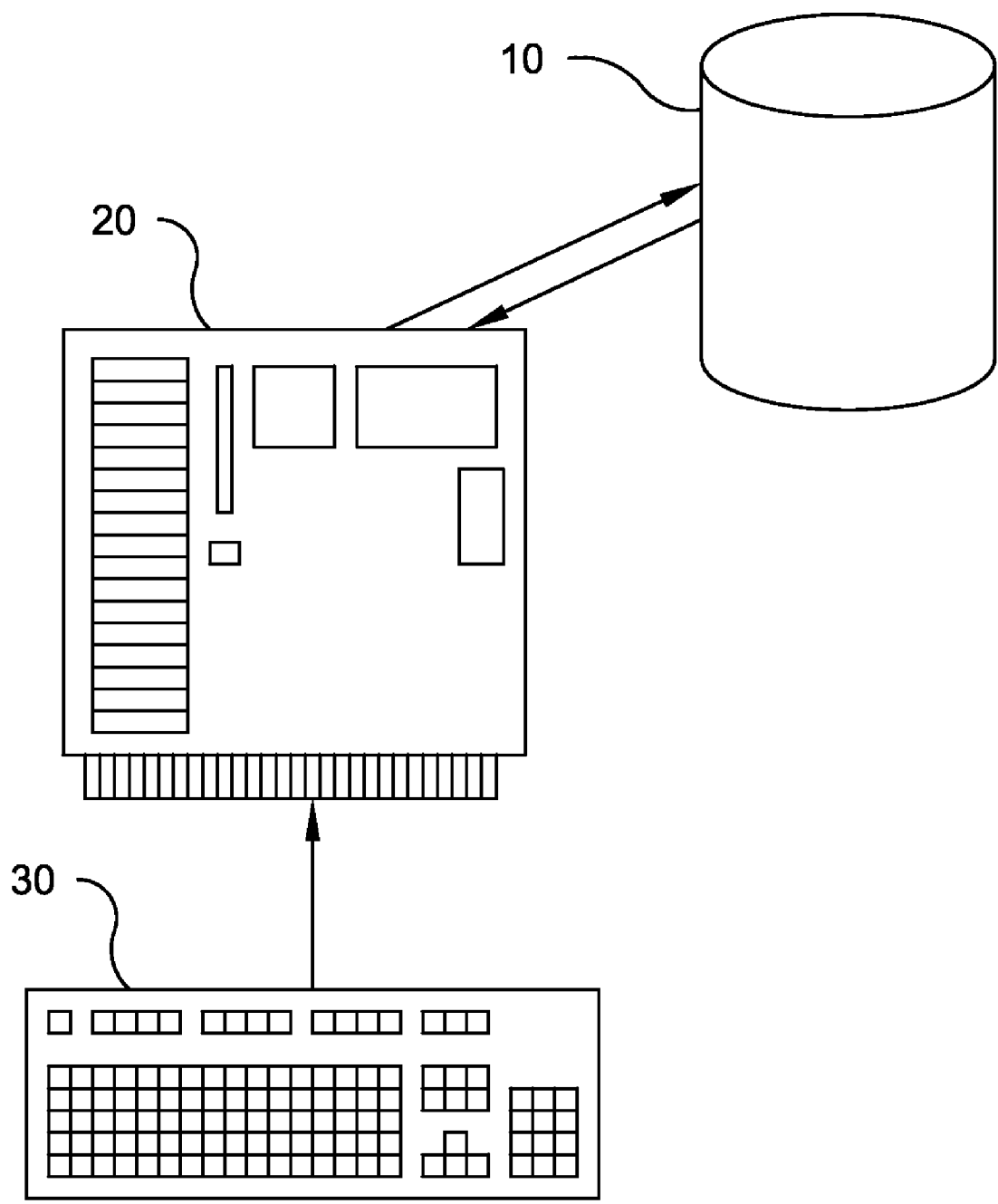
FIG. 2 is a diagram of a system for administering a preferred embodiment of the present invention.

FIG. 2 is a diagram of a system for administering the present invention. The software for implementing the method and product resides on a computer 20. The data including the account value of each client, the type of interest rate selected, the MYG, interest credits earned, date of each rate adjustment (anniversary), as well as additional client information is stored in permanent storage 10. This may take the form of tape, disk, 15 flash memory and other well-known forms of digital storage. A keyboard 30 is used to input changes to the system 20, such as when the client selects a new form of interest rate. However, any standard input tool such as a mouse, card reader, wireless signal, etc. can be used with the system 20.

Table 1, set forth below, further illustrates how the lock-in feature would work in accordance with the present invention, when applied to a 7-year, fixed annuity, issued in this instance on Dec. 31, 2006.

TABLE 1

| Anniversary | Annual Reset Bucket | Guaranteed Bucket | Account Value | Annual Reset Rate | MYG Rate | Interest Credits |
|---|---|---|---|---|---|---|
| Dec. 31, 2006 | 100,000 | — | 100,000 | 4.2% | 4.0% | |
| Dec. 31, 2007 | 104,200 | — | 104,200 | 4.4% | 4.0% | 4,200 |
| Dec. 31, 2008 | 108,785 | — | 108,785 | 4.6% | 4.0% | 4,585 |
| Dec. 31, 2009 | 113,789 | — | 113,789 | 4.8% | 4.0% | 5,004 |
| Dec. 31, 2010 | 119,251 | — | 119,251 | 4.5% | 4.0% | 5,462 |
| Dec. 31, 2011 "Lock-In" | 124,617 | — | 124,617 | 3.0% | 4.0% | |
| Dec. 31, 2011 | — | 124,617 | 124,617 | 3.0% | 4.0% | 5,366 |
| Dec. 31, 2012 | — | 129,602 | 129,602 | 5.0% | 4.0% | 4,985 |
| Dec. 31, 2013 | — | 134,786 | 134,786 | 5,184 | | |

The system deposits client funds in the annual reset bucket to earn the initial rate (reset rate) of 4.2% as of Dec. 31, 2006. At this point in time, the reset rate of 4.2% exceeds the MYG rate. On the first anniversary, Dec. 31, 2007, the reset rate rises to 4.4% while the MYG rate remains static at 4.0%. The client, at this point, has earned 4,200 interest credits generated by multiplying the reset rate of 4.2% by the account value of $100,000. The interest credits, or 4,200, are added to the amount in the annual reset bucket ($100,000), yielding $104, 200, the account value as of Dec. 31, 2007.

On the second anniversary, Dec. 31, 2008, the reset rate is raised, once again, to 4.6%. By this time, 4,585 interest credits have been earned by multiplying 4.4%, the year 2007 interest rate, by the year 2007 account balance of $104,200. The interest credits are added to the account value yielding an account value of $108,785 as of Dec. 31, 2008. This process is repeated in years 2008, 2009, and 2010.

In year 2011, the lock-in feature of the present invention takes effect. As of Dec. 31, 2011, the reset rate falls to 3.0%, which is lower than the MYG rate of 4.0%. At this point, if the automatic option has been selected by the client, or if the client manually elects the lock-in option, the clients interest rate switches to the MYG rate. Accordingly, for the following year, year 2012, the interest applied is not the reset rate of 3.0% but rather, the MYG rate of 4.0%. Instead of earning $3,739, which would correspond to an interest rate of 3.0%, the account value earns $5,366, which corresponds to an interest rate of 4.0%. Furthermore, the account value from this date forward until the end of the contract, in this case year 7, earns interest credits corresponding to the credits earned using the MYG rate as a multiplier.

A data processing method for administering a deferred annuity product for an annuitant, during the accumulation phase of a contract term, the annuity product having a contract value, a guaranteed interest rate, and a reset interest rate, includes the steps of: a. during the accumulation phase: i. declaring a guaranteed interest rate for a guaranteed period; ii. at predetermined intervals, determining a reset interest rate, wherein the reset interest rate may be equal to the guaranteed interest rate, higher than the guaranteed interest rate, or lower than the guaranteed interest rate; iii. applying the guaranteed interest rate to premiums deposited into a guaranteed account for accumulating an account value; iv. applying the reset interest rate to premiums deposited into a reset account for accumulating an account value; b. in the event that the reset interest rate falls below the guaranteed interest rate: i. providing the annuitant with an option to request a transfer of the account value from the guaranteed account to the reset account, whereby the account value is calculated according to the guaranteed interest rate for the remainder of the contract term.

In an embodiment of the method, the transfer of the account value is a one-time transfer.

In an embodiment of the method, the annuitant exercises the option to request a transfer of the account balance, at the start of the contract term, and the transfer takes place automatically, when the reset interest rate falls below the guaranteed interest rate.

In an embodiment of the method, the reset interest rate is based upon an external index.

In an embodiment of the method, the reset interest rate is declared on an annual basis.

A data processing method for administering a deferred annuity account, with a declared contract period, has an interest rate earned by premiums deposited by an annuitant set to a guaranteed interest rate, declared at the time the annuity is issued, and the annuitant has the option of selecting the guaranteed rate or a reset interest rate which is declared annually, and the annuitant has the further option of selecting the reset interest rate initially and transferring the annuitant's account balance to an account earning the guaranteed interest rate, when the guaranteed rate is higher than the reset interest rate, such transfer being a one-time, irrevocable transfer lasting until expiration of the contract period.

A deferred annuity product includes: a. means for calculating and paying a guaranteed interest rate on deposited premiums to generate an account value in a first account; b. means for calculating a reset interest rate, on an annual basis, and paying the reset interest rate on deposited premiums to generate an account value in a second account; c. means for identifying when the guaranteed interest rate has a value lower than the reset interest rate; and d. means for transferring the account value from the first account to the second account for the duration of a contract term, whereby the account value earns interest at the guaranteed interest rate.

A system for administering a deferred annuity product having a predefined term and an account value, during the accumulation phase, includes: a. first interest rate means for establishing a guaranteed interest rate; b. second interest rate means for establishing a reset interest rate which is updated at predefined periods; c. first selection means for selecting the guaranteed interest rate or the reset interest rate; d. calculation means for calculating interest credits and incrementing the account value with interest credits, based upon the selected interest rate; e. second selection means for providing the annuitant with an option to request a transfer from the reset interest rate to the guaranteed interest rate, in the event that the reset interest rate is the selected interest rate and the reset interest rate falls below the guaranteed interest rate.

In an embodiment of the system, the second selection means operates automatically and the request to transfer the reset interest rate to the guaranteed interest rate, in the event that the reset interest rate falls below the guaranteed interest rate, is selected upon issuance of the annuity.

In an embodiment of the system, as claimed in claim 9, wherein the reset interest rate is updated annually.

A data processing method is for administering a deferred annuity product during the accumulation phase, for a contract term, wherein the annuity product permits the consumer to select successively a first interest rate which is reset periodically and a second interest rate, guaranteed for multiple years, during the same contract term.

The detailed illustrative embodiment here presented is directed at providing a more complete understanding of the invention. The specific techniques, systems, and operating structures set forth to illustrate the principles and practice of the invention may be embodied in a wide variety of sizes, shapes, forms and modes, some of which may be quite different from those in the disclosed embodiment. Consequently, the specific structural and functional details disclosed herein are exemplary. They are deemed to afford the best embodiment for purposes of disclosure; but should not be construed as limiting the scope of the invention.

What is claimed is:

1. A system for administering a deferred annuity product, during the accumulation phase, comprising:
    a receiver configured to receive: information relating to issuing said deferred annuity product, information relating to selecting a reset interest rate, information relating to selecting a guaranteed interest rate, and information relating to whether to adjust said reset interest rate during said accumulation phase, wherein said deferred annuity product has a predefined term and an account value; and
    a processing module configured to determine said reset interest rate, for determining said guaranteed rate, and for determining whether to adjust said reset interest rate at predetermined time interval or intervals, wherein said processing module is at or associated with a provider of said deferred annuity product,
    wherein said system determines whether said deferred annuity product is issued at said reset interest rate, and
    further wherein said system determines whether said reset interest rate is below said guaranteed interest rate at said predetermined time interval or intervals if said deferred annuity product is issued with said reset interest rate, and
    wherein said system converts an interest rate applicable to said annuity product to said guaranteed interest rate for a duration of the accumulation phase responsive to the determination that said reset interest rate is below said guaranteed interest rate.

2. The system of claim 1, wherein said system converts the interest rate applicable to said annuity product to said guaranteed interest rate for the duration of the accumulation phase responsive further to a request received from an owner of the annuity product.

3. The system of claim 1, wherein the system is configured to convert the interest rate applicable to said annuity product to said guaranteed interest rate for the duration of the accumulation phase automatically responsive to the determination that said reset interest rate is below said guaranteed interest rate.

4. The system of claim 1, wherein the predetermined time interval or intervals is an annual time interval.

5. The system of claim 1, wherein the system is configured to credit an account of said annuity product with an amount based on the account value and the determined interest rate.

6. A computer-implemented method for determining a rate of interest to credit to an account of a deferred annuity for a period during an accumulation phase of the deferred annuity, the deferred annuity having associated therewith a variable interest rate, and a fixed interest rate, fixed at an issue date of the deferred annuity;

determining by a computer, in response to data indicating that a value of the variable interest rate applicable to the period is less than the fixed rate, whether a customer option has been preset, for automatic application of the fixed rate for the period and for a remainder of the accumulation phase;

upon determining that the customer option for automatic application of the fixed rate has been preset, providing by the computer an output indicative of applying the fixed rate in crediting interest for the period and for the remainder of the accumulation phase; and otherwise, providing by the computer a request for a customer input for (i) applying the variable interest rate in crediting interest for the period; or (ii) applying the fixed rate in crediting interest for the period and for the remainder of the accumulation phase.

7. The computer-implemented method of claim 6, further comprising, responsive to the customer input for applying the variable interest rate in crediting interest for the period, providing an output indicative of applying the variable interest rate in crediting interest for the period.

8. The computer-implemented method of claim 7, further comprising, after said step of providing an output indicative of applying the variable interest rate in crediting interest for the period, for a subsequent period during the accumulation phase, comparing a value of the variable interest rate for the subsequent period with the value of the fixed interest rate.

9. The computer-implemented method of claim 6, further comprising, responsive to the customer input for applying the fixed rate in crediting interest for the period and for the remainder of the accumulation phase, applying the fixed rate in crediting interest for the period and for the remainder of the accumulation phase.

10. The computer-implemented method of claim 6, further comprising, prior to the determining whether the customer option has been preset, receiving by the computer the value of the variable interest rate applicable to the period, and comparing the value of the variable interest rate applicable to the period with a value of the fixed interest rate.

11. The computer-implemented method of claim 6, wherein the period is one year.

12. The computer-implemented method of claim 6, further comprising accessing by the computer from a memory device a date of an adjustment in the value of the variable interest rate.

13. The computer-implemented method of claim 6, further comprising receiving a response to the request for customer input via one of a keyboard, mouse, card reader and wireless signal.

14. A computer system for determining a rate of interest to credit to an account of a deferred annuity for a period during an accumulation phase of the deferred annuity, comprising:

a memory device for storing: a value of the account; a current value of an adjustable rate, the value of the adjustable rate being variable during the accumulation phase, for crediting interest to the account; a value of a fixed rate, fixed at an issue date of the deferred annuity, for crediting interest to the account; and a computer in communication with the memory device, the computer being configured to:

determine, in response to data indicating that the value of the adjustable rate applicable to the period is less than the fixed rate, whether a customer option has been preset, for automatic application of the fixed rate for the period and for a remainder of the accumulation phase;

upon determining that the customer option for automatic application of the fixed rate has been preset, provide an output indicative of applying the fixed rate in crediting interest for the period and for the remainder of the accumulation phase; and otherwise, provide a request for a customer input for (i) applying the adjustable rate in crediting interest for the period; or (ii) applying the fixed rate in crediting interest for the period and for the remainder of the accumulation phase.

15. The computer system of claim 14, wherein the computer is further configured to: access from the memory device the value of the adjustable rate applicable to the period and the fixed rate; and determine whether the value of the adjustable rate applicable to the period is less than the fixed rate.

16. The computer system of claim 14, wherein the computer is further configured to, responsive to the customer input for applying the adjustable rate in crediting interest for the period, provide an output indicative of applying the adjustable rate in crediting interest for the period.

17. The computer system of claim 16, wherein the computer is further configured to, after providing the output indicative of applying the adjustable rate in crediting interest for the period, for a subsequent period during the accumulation phase, compare a value of the adjustable rate for the subsequent period with the value of the fixed rate.

18. The computer system of claim 14, wherein the computer is further configured to, responsive to the customer input for applying the fixed rate in crediting interest for the period and for the remainder of the accumulation phase, apply the fixed rate in crediting interest for the period and for the remainder of the accumulation phase.

19. The computer system of claim 14, wherein the current value of the adjustable rate is determined based on an index.

20. The computer system of claim 14, wherein the current value of the adjustable rate is adjusted by an issuer of the deferred annuity by the issuer in the discretion of the issuer.

* * * * *